March 15, 1932. H. C. CARTER 1,849,174
SAFETY DEVICE FOR TRANSMISSIONS
Filed Jan. 15, 1930
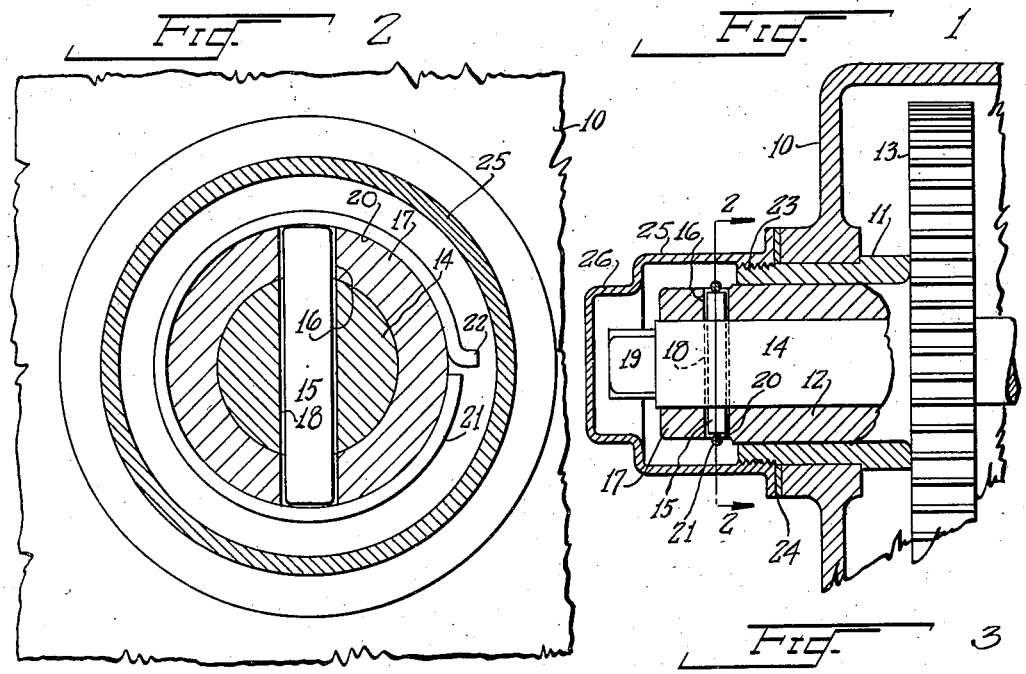
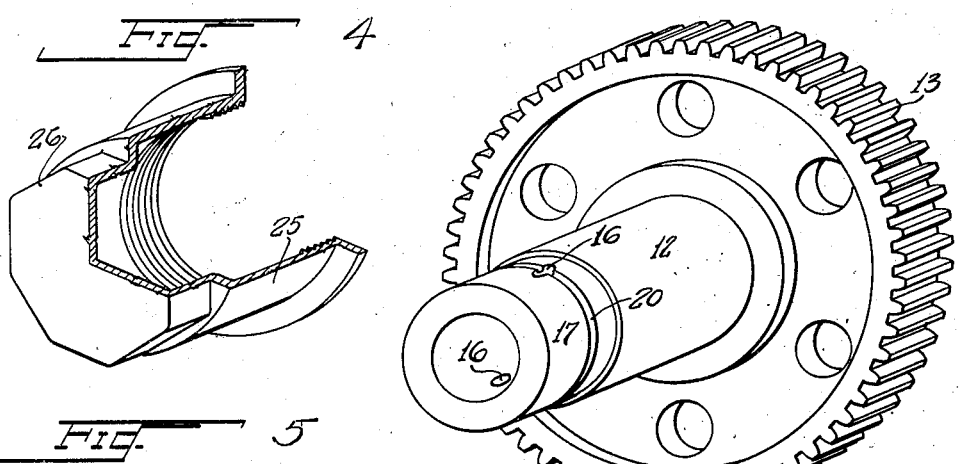
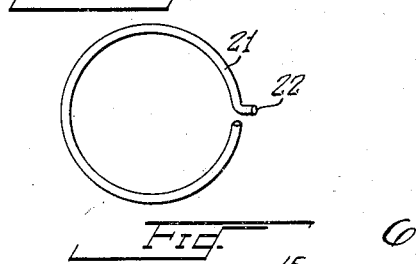
INVENTOR
H.C. CARTER
BY
ATTORNEY Patented Mar. 15, 1932

1,849,174

UNITED STATES PATENT OFFICE

HASKELL C. CARTER, OF PORTLAND, OREGON, ASSIGNOR TO IRON FIREMAN MANUFACTURING COMPANY, OF PORTLAND, OREGON

SAFETY DEVICE FOR TRANSMISSIONS

Application filed January 15, 1930. Serial No. 420,884.

This invention relates generally to the transmission of power, and particularly to a safety device for use in connection with coal burning stokers of the underfeed type.

The main object of this invention is to provide a shear pin in the transmission of the stoker which would prevent the apparatus from becoming damaged by metal, stone, wood or other foreign substance finding its way into the fuel supply, provided this substance was of a nature to place an undue load on the feeding mechanism.

The second object is to provide a safety pin arrangement which will be readily accessible and easy to replace.

The third object is to so arrange the elements in the device that it will not only be easy to remove the sheared pin but also to realign the parts for the insertion of a new one, and also to insure the new one remaining in position as long as desired.

The fourth object is to so construct the parts that the shearing elements may be hardened while the pin itself may be of soft steel, making it possible for the device to shear many pins before its cutting edges become dull.

The fifth object is to so arrange the parts that a spring retainer may be provided for the shearing pin and a cap employed to completely enclose the shearing device to keep out dust, and also to prevent lubricant from escaping therefrom.

These, and other objects, will become more apparent from the specification following as illustrated in the accompanying drawings, in which:

Figure 1 is a longitudinal section through the device.

Figure 2 is a transverse section along the line 2—2 in Figure 1.

Figure 3 is a perspective view of the shear pin gear.

Figure 4 is a perspective view of the cap with a portion broken away in section.

Figure 5 is a view of the retaining ring.

Figure 6 is a perspective view of the shear pin.

Similar numbers of reference refer to similar parts throughout the several views.

Referring in detail to the drawings, there is shown a portion of the transmission casing 10 in which is mounted a bronze bushing 11 in which journals the hub 12 of the shear pin gear 13 which is mounted on the shaft 14 and is normally sustained in a driving relation thereto by means of a soft steel shear pin 15 which passes loosely through a hole 16 in the reduced end 17 of the hub 12, and also through a hole 18 in the shaft 14. The shaft 14 is provided with a flattened end 19 which projects outside of the outer end of the hub 12.

Surrounding the reduced portion 17 of the hub 12 is a groove 20 which intersects the ends of the hole 16. The groove 20 is formed for a snap ring 21 preferably provided with an out-turned end 22 to expedite the removal thereof.

The bushing 11 has its outer end 23 threaded and the threaded end carries the gasket 24 against which seats the threaded cap 25, which cap is preferably provided with a flat sided end 26 to expedite its removal with a wrench.

The operation of the device is as follows: If, due to any abnormal load being placed on the mechanism, the pin 15 becomes sheared it is only necessary to remove the cap 25 and spring the snap ring 21 out of the groove 20. A wrench is then placed on the end 19 so that the holes 16 and 18 may be brought into register and the sheared pin portions easily removed therefrom. Owing to the looseness of the fit this is a very easy operation. A new pin is then put into position and the snap ring 21 returned to its groove, after which the cap 25 is again replaced.

It is desirable to harden the portion of the shaft 14 and the member 12 which are in intimate contact with the pin 15 to enable them to perform the shearing operation repeatedly without deterioration.

I claim:

In a transmission the combination of a housing, a bushing mounted in said housing having one end thereof projecting outside of same, the projecting end threaded and surrounded by a gasket, a gear having an elongated hub journaling in said bushing and extending outside of its projecting end, a shaft passing through said hub having a flattened portion extending outside of said hub, said hub and shaft having a continuous hole formed therethrough, a soft steel pin loosely occupying said hole, said hub having a groove formed around same extending across the ends of said hole, a snap ring having an outturned end occupying said groove, and a cap adapted to enclose the projecting end of said hub and shaft and to thread upon the outer end of said bushing against said gasket.

HASKELL C. CARTER.